United States Patent Office 3,806,381
Patented Apr. 23, 1974

3,806,381
EPITAXIAL DEPOSITION OF $GaAs_{1-x}P_x$ ON A SUBSTRATE

Ichiro Asao, Osaka, Japan, assignor to Matsushita Electric Industrial Company, Osaka, Japan Filed May 3, 1972, Ser. No. 249,891
Claims priority, application Japan, May 4, 1971, 46/29,695
Int. Cl. H01l 7/36
U.S. Cl. 148—175 1 Claim

ABSTRACT OF THE DISCLOSURE

A process for preparing by vapor phase reaction a $GaAs_{1-x}P_x$ monocrystal which is useful as an electroluminescent material, wherein a ternary monocrystal having a phosphorus content of $0.35 \leq X \leq 0.43$ is epitaxially deposited on a substrate by controlling temperature of a source material of GaAs and a feed rate of $PCl_3$ gas flowing over the source material toward the substrate.

This invention relates to a process for preparing a ternary semiconductive material, and more particularly to a process for preparing by vapor phase reaction a $GaAs_{1-x}P_x$ crystal which is useful as an electroluminescent material.

A $GaAs_{1-x}P_x$ crystal having a phosphorus content of $0.35 \leq X \leq 0.43$ is satisfactorily usable for electroluminescent material.

A typical example of the process generally known to the art for preparing a $GaAs_{1-x}P_x$ crystal is described in an article inserted in "Journal of the Electrochemical Society," vol. 111, No. 7, July 1969, pp. 814–817; entitled, "Preparation of $GaAs_{1-x}P_x$ by Vapor Phase Reaction," by W. F. Finch et al. In this known process, a gaseous mixture of $AsCl_3$ and $PCl_3$; $AsH_3$, $PH_3$ and HCl; or $AsCl_3$ and $PH_3$ is carried by $H_2$ gas and then passed over Ga or GaAs source material which is placed in a higher temperature section of a reaction tube.

$GaAs_{1-x}P_x$ is epitaxially deposited on the substrate of GaAs monocrystal placed in a lower temperature section of the open reaction tube by vapor phase reaction. A desired proportion or ratio of the arsenic to phosphorus components of the resultant material is achieved by changing the mixing ratio of $AsCl_3$ and $PCl_3$ vapors. However, great difficulty is encountered in automatically controlling the mixing ratio of the $AsCl_3$ and $PCl_3$ gases, when Ga is used as a source material. On the other hand, when GaAs is used as a source material $GaAs_{0.67}P_{0.33}$ is the highest phosphorus content that has thus far been produced by the known process.

It is therefore the primary object of the present invention to provide a process for preparing $GaAs_{1-x}P_x$ crystal suitable for use as an electroluminescent material.

Another object of the invention is to provide a process for preparing $GaAs_{1-x}P_x$ crystal with phosphorus content of $0.35 \leq X \leq 0.43$.

Still another object of the invention is to provide a process for preparing a $GaAs_{1-x}P_x$ crystal of the composition mentioned above, wherein the phosphorus content may be varied simply by controlling the temperature of the source material and feed rate of the source gas to be introduced into the reaction chamber.

The above and other objects and features of the invention will be apparent from the following description and claims taken in conjunction with the accompanying drawings, wherein:

According to the present invention there is provided a process for preparing a $GAs_{1-x}P_x$ crystal where $x$ is $0.35 \leq X \leq 0.43$, comprising the steps of: preparing a reaction chamber having a higher temperature section or first zone and a lower temperature section or second zone; placing a substrate at the lower temperature section of the reaction chamber; placing source material of GaAs at the higher temperature section of the reaction chamber and maintaining the source material at a temperature of from 850° C. to 1000° C.; introducing $PCl_3$ gas carried by $H_2$ gas into the reaction chamber at a feed rate of from $1 \times 10^{-5}$ to $1 \times 10^{-4}$ mole-min. from the higher temperature section of the reaction chamber toward the lower temperature section of the reaction chamber allowing the $PCl_3$ gas to react with the source material, whereby a film of $GaAs_{1-x}P_x$ is deposited on the substrate.

Figure 1:
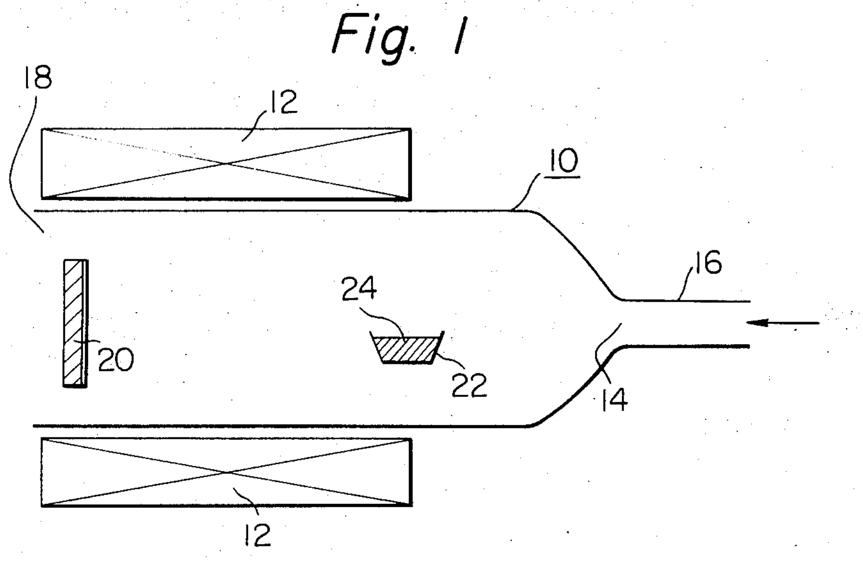
FIG. 1 is a diagrammatic view of an apparatus employed for carrying out the present invention.

In FIG. 1 there is shown an apparatus employed for carrying out a process according to the invention, which apparatus comprises a reaction tube or chamber 10 surrounded by a heating coil 12 and having at one end an inlet 14 communicated to a passage 16 through which a source gas is introduced into the chamber 10. The chamber 10 has at the other end an outlet 18 in the vicinity of which there is placed a substrate 20. A material useful as a substrate 20 may be a monocrystal of either GaAs, GaP or Ge. A source material container 22 is placed in a suitable position between the inlet 14 and the substrate 20. The container 22 carries a source material 24 of GaAs which is to be reacted with source gas of $PCl_3$ supplied through the passage 16 into the reaction chamber 10. The source material 24 is maintained at a first predetermined temperature $T_1$ of from 850° C. to 1000° C. while the substrate 20 is maintained at a second predetermined temperature $T_2$ of from 750° C. to 830° C.

A temperature gradient of from 10° C./cm. to 15° C./cm. may be established in the vicinity of the substrate 20 in order to deposit a satisfactory $GaAs_{1-x}P_x$ monocrystal thereon. The temperature gradient of the reaction chamber 10 may be achieved by providing an appropriate heating coil 12 as shown or by other known means.

$PCl_3$ gas carried by $H_2$ gas is first supplied through the passage 16 to the chamber 10. It is assumed that the following reactions take place in the vicinity of the source material 24 to form a reaction gas mixture:

$$2PCl_3+3H_2 \rightleftarrows 6HCl+\frac{1}{2}P_4 \quad (1)$$

$$4GaAs+4HCl \rightleftarrows 4GaCl+As_4+2H_2 \quad (2)$$

The resultant reaction gas mixture flows toward the substate 20, whereby $GaAs_{1-x}P_x$ crystal epitaxially deposits on the substrate 20.

It is assumed that $GaAs_{1-x}P_x$ crystal epitaxially deposits on the substrate 20 through the reactions represented by the following formulae:

$$3GaCl+\frac{1}{2}P_4 \rightleftarrows 2GaP+GaCl_3 \quad (3)$$

$$3GaCl+\frac{1}{2}As_4 \rightleftarrows 2GaAs+GaCl_3 \quad (4)$$

Equilibrium constants $K_1$ and $K_2$ of the reaction Formulae 1 and 2 at the temperature of $T_1$, respectively, are represented by the following equations:

$$K_1=\frac{P_{HCl}^6\times P_{P_4}^{\frac{1}{2}}}{P_{PCl_3}^2\times P_{H_2}^4} \quad (A)$$

$$\frac{P_{GaCl}^4\times P_{As_4}\times P_{H_2}^2}{P_{HCl}^4}$$

Since GaAsP crystal does not separate from the resultant gaseous mixture, molecular numbers of Cl and P contained in the resultant gaseous mixture are conserved. As a result, the following equations of equilibrium state are obtained:

$$\frac{N^\circ_{Cl}}{V}RT=P_{HCl}+3P_{PCl_3}+P_{GaCl} \quad (C)$$

$$\frac{N^\circ_{P}}{V}RT=P_{PCl_3}+4P_{PCl_5} \quad (D)$$

Still further, Ga and As are contained in the same quantity in the resultant reaction gas mixture. Thus, the following partial pressure equation can be justified:

$$N_{Ga}=N_{As}, \text{ hence } P_{GaCl}=4P_{As4} \quad (E)$$

Because the reactions represented by the Formulae 1 and 2 occur in the open reaction chamber 10, total pressure of the reaction gas mixture is substantially 1 atm. and thus the following equation is obtained:

$$1=P_{PCl3}+P_{H2}+P_{HCl}+P_{P4}+P_{GaCl}+P_{As4} \quad (F)$$

Phosphorus content $x$, as given by the formula $$x=\frac{P}{As+P}$$

in the reaction gas mixture can be calculated from the above Equations A to F. In the Equations A to F, characters $P_i$, $N^\circ_i$, $N_i$, R, V and T represent the following values where suffix $i$ shows the respective component materials:

$P_i$: partial pressure of each component (atm.)
$N^\circ_i$: moles of each component introduced in the reaction chamber (mole)
$N_i$: moles of each component (mole)
R: gas constant
T: absolute temperature (°K)

Figure 2:
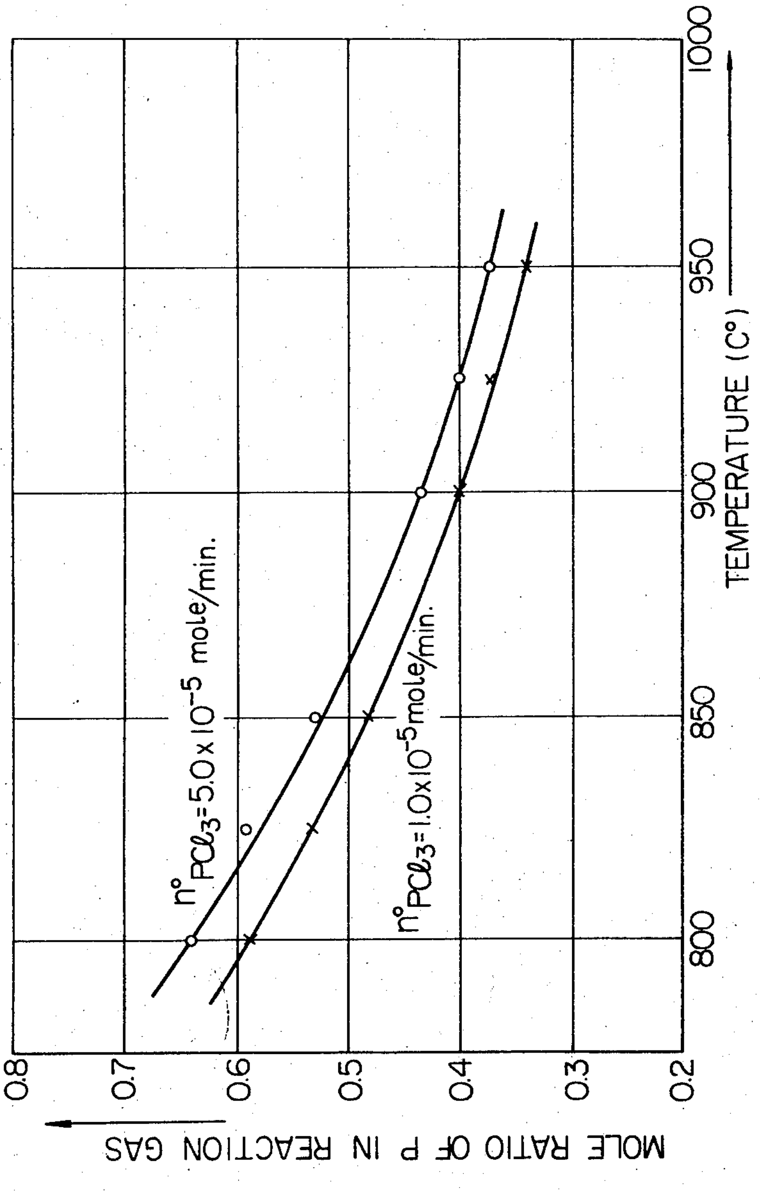
FIG. 2 is a graphic representation of mole ratio of phosphorus in the reaction gas mixture, plotted in terms of temperature.

Curves in a graph of FIG. 2 have been obtained by plotting the results of calculation according to Equations A to F. Abscissa of the graph shows the temperature $T_1$ of the source material, and the ordinate shows variation in mole ratio of P in the reaction gas mixture. As seen from the graph of FIG. 2, gas atmosphere containing a desired ratio of P in the reaction chamber can be obtained by controlling the feed rate of $PCl_3$ gas introduced into the reaction chamber and concurrently controlling the temperature $T_1$ of the source material. It follows that $GaAs_{1-x}P_x$ crystal having a desired phosphorus content can be prepared by allowing the reaction gas mixture to epitaxially deposit on the substrate. Mole ratio of P in the reaction gas mixture increases as the temperature $T_1$ of the source material decreases. It is also apparent from the graph of FIG. 2 that mole ratio of P in the reaction gas mixture increases as the feed rate of $PCl_3$ introduced into the reaction chamber increases.

Figure 3:
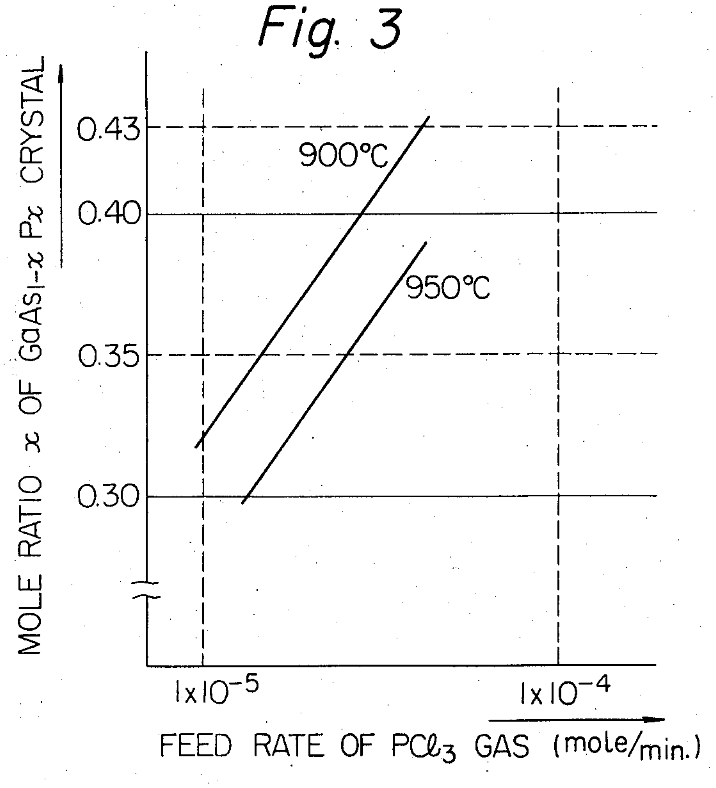
FIG. 3 is a graphic representation of the relationship between the feed rate of $PCl_3$ gas introduced in the reaction chamber and the phosphorus content in the resultant $GaAs_{1-x}P_x$ crystal.

FIG. 3 represents an analytical result of mole ratio $x$ of P of $GaAs_{1-x}P_x$ crystals prepared by the process of the invention, wherein abscissa shows the quantity of $PCl_3$ gas introduced in the reaction chamber on a logarithmic scale and the ordinate shows the mole ratio of P of the resultant GaAsP crystal.

As seen from FIG. 3, when the temperature $T_1$ of the source material is maintained at a substantially constant value, mole ratio $x$ increases linearly as the feed rate of $PCl_3$ gas introduced into the reaction chamber increases. It is also apparent from FIG. 3 that mole ratio $x$ decreases as the temperature $T_1$ of the source material increases.

In order to obtain a satisfactorily crystallized GaAsP, the temperature $T_1$ of the source material should be maintained at a temperature of from 850° C. to 1000° C. If the temperature $T_1$ exceeds 1000° C., reaction would be accelerated, resulting in polycrystallization of the depositing GaAsP. On the contrary, if the temperature $T_1$ is reduced to a temperature below 850° C., the temperature $T_2$ of the substrate material is reduced accordingly, thus unduly retarding crystallization of GaAsP.

The temperature $T_2$ of the substrate may be varied within the range of from 750° C. to 830° C. The most preferable temperature range for obtaining a GaAsP monocrystal having excellent characteristics is from 800° C. to 820° C.

It will be understood in consideration of FIG. 3 that the feed rate of $PCl_3$ introduced into the reaction chamber may be varied over a wide range. However, the flow rate is preferably $1\times10^{-5}$ mole/min. to $1\times10^{-4}$ mole/-min. in order to grow a satisfactory GaAsP crystal at an appropriate speed. If the feed rate of $PCl_3$ gas is greater than $1\times10^{-4}$ mole/min., then reaction speed becomes too high to cause the resultant GaAsP to have degraded crystal structure. On the contrary, if feed rate is less than $1\times10^{-5}$ mole/min., then the reaction speed becomes too low and is unsuitable for practical application.

The following examples are given for the purpose of clarifying more detailed features of the present invention.

EXAMPLE I

GaAs monocrystal was used as a substrate. Temperature $T_1$ of the source material was maintained at 900° C. Temperature $T_2$ of the substrate was maintained at 800° C. $PCl_3$ gas carried by 100 cc./min. of $H_2$ gas was introduced into the reaction chamber at the feed rate of $3.0\times10^{-5}$ mole/min. This resulted in a $GaAs_{0.6}P_{0.4}$ monocrystal.

EXAMPLE II

GaP monocrystal was used as a substrate. Temperature $T_1$ of the source material was maintained at 950° C. Temperature $T_2$ of the substrate was maintained at 810° C. $PCl_3$ gas carried by 100 cc./min. of $H_2$ gas was introduced into the reaction chamber at the feed rate of $2.6\times10^{-5}$ mole/min. This resulted in the deposition of an epitaxial monocrystalline layer of $GaAs_{0.65}P_{0.35}$.

EXAMPLE III

GaAs monocrystal was used as a substrate. Temperature $T_1$ of the source material was maintained at 900° C. Temperature $T_2$ of the substrate was maintained at 820° C. $PCl_3$ gas carried by 150° cc./min. of $H_2$ gas was introduced into the reaction chamber at the feed rate of $2.2\times10^{-5}$ mole/min. This resulted in $GaAs_{0.62}P_{0.38}$.

It will be understood that the foregoing description has been advanced only by way of example and will suggest to those skilled in the art new and other manners of using the principles of this invention. It is therefore intended that the invention be limited only by the scope of the appended claim.

What is claimed is:

1. A process for depositing a uniform monocrystalline film of $GaAs_{1-x}P_x$ on a substrate, comprising:

heating a source material of GaAs in a first zone maintained at a variable temperature in the range of 850° to 1000° C.;

heating a substrate in a second zone maintained at a temperature in the range of 800° and 820° C., said substrate being composed of a material selected from the group consisting of GaAs, GaP and Ge;

introducing $PCl_3$ gas carried by $H_2$ gas into said first zone, said $PCl_3$ gas being introduced at a variable feed rate within the range of $1\times10^{-5}$ and $1\times10^{-4}$ mole/min. depending on the temperature of the source material for reacting with said source material to produce reactants; and depositing said reactants on said substrate to produce a monocrystalline film of $GaAs_{1-x}P_x$ in which $x$ varies from 0.35 to 0.43.

References Cited

UNITED STATES PATENTS

| | | | |
|---|---|---|---|
| 3,441,000 | 4/1969 | Burd et al. | 148—175 X |
| 3,145,125 | 8/1964 | Lyons | 148—175 |
| 3,338,761 | 8/1967 | Cheney et al. | 148—175 |
| 3,421,952 | 1/1969 | Conrad et al. | 148—175 |
| 3,178,313 | 4/1965 | Moest | 148—175 UX |
| 3,511,723 | 5/1970 | Burd | 148—175 |

G. T. OZAKI, Primary Examiner

U.S. Cl. X.R.

148—174; 252—62.3 GA; 117—201